UNITED STATES PATENT OFFICE.

CARLETON ELLIS, OF MONTCLAIR, NEW JERSEY.

POLYMERIZED-OIL SOAP.

1,178,142.  Specification of Letters Patent.  Patented Apr. 4, 1916.

No Drawing.  Application filed February 15, 1915.  Serial No. 8,300.

*To all whom it may concern:*

Be it known that I, CARLETON ELLIS, a citizen of the United States, and a resident of Montclair, in the county of Essex and State of New Jersey, have invented certain new and useful Improvements in Polymerized-Oil Soap, of which the following is a specification.

This invention relates to soaps and similar saponified products and to the process of making same and relates particularly to soaps prepared from oils deodorized or improved in consistency by polymerization especially in conjunction with hydrogenation or similar saturating treatment.

This application, so far as the polymerization of oils is concerned, is a continuation of certain matter filed July 26, 1912 now Patent No. 1,052,469 of Feb. 11, 1913, such continuity existing by virtue of my copending application Serial No. 718,288, filed September 3, 1912, now Patent 1,067,978 of July 22, 1913 and Serial No. 762,296, filed April 19, 1913, from which the subject matter of the present application especially as concerns the production for the present purpose of polymerized and hydrogenated oils has been immediately derived.

Fatty acids and unsaturated oils such as the glycerids containing more especially two or more double bondings or olefin groupings are capable of polymerization at elevated temperatures resulting in a thickening of the oil due not so much to the formation of stearin as to the formation of oil complexes by the union of oil molecules one with another, usually denoted by a profound reduction of the iodin number and other changes. In this manner castor, fish, whale, cotton, corn, linseed, rape and tung oil and the like may be polymerized to differing degrees and by such hydrogenation a thickening of the oil usually occurs which thickening produces a body of viscosity that enables hydrogenation, if carried out, to yield a product containing a fatty derivative of good texture or consistency. The polymerized oil further saturated if desired by hydrogenation or by hydroxylation may be used in making lubricants, or the product may be sulfonated by treatment with sulfuric acid or soaps may be prepared from the material by saponification with alkalis.

When catalyzers such as nickel oxid material are employed, it is preferred first to polymerize the oil at about 250° C. and then to reduce the temperature and harden by means of hydrogen or hydrogen and oxygen at a temperature around 200° C. When using palladium the temperature may be much lower.

Hardened or hydrogenated oil produced by simple hydrogenation is not capable of yielding soaps having as free lathering qualities as often is desired, while the polymerized and hardened hydrogenated oil of desirable consistency show superior lathering qualities when converted into soap.

To remove the odor from fish and whale oil by hydrogenation requires a considerable conversion to stearin. Usually it is necessary to reduce the iodin number of fish oil to 40 or 50 in order to convert the unsaturated bodies such as clupanodonin which are supposed to be more or less odor-producing into more saturated or entirely saturated bodies rendering the oil free from disagreeably fishy odor. But hydrogenation to this point produces so large a proportion of stearin which lathers freely as a soap only in very hot or boiling water that the product when used with cold or slightly warm water is deficient in lathering and consequent detergent properties. By polymerization the property of cold lathering existent in the soaps produced from normal fish oil is to a considerable degree present in the polymerized oils and any further hardening which may be desired and which is secured by hydrogenation does not impair these lathering qualities to any material degree in connection with the production of fats for making hard soaps. Hence polymerization enables the production from oils and fats of thickened or hardened product without the necessity of carrying hydrogenation forward to such a degree that the lathering properties of the soap are seriously impaired.

As an illustrative example of the preparation of the fatty material fish oil may be heated to 250° C. for 12 hours in an atmosphere of hydrogen and may then be hydrogenated by treating for 2 hours at a somewhat lower temperature with hydrogen gas using nickel oxid as a source of catalyzer, or whale oil may be heated at 260° C. for 20 hours in an atmosphere of hydrogen or of a hydrogen-containing gas; or whale oil may be heated to 250° C. in the presence of a catalyzer and hydrogen for 4 hours. Preferably the hydrogen is passed through a body of the oil in such a manner as to keep the catalyzer which preferably should be finely divided, thoroughly disseminated through the body of oil. By operating in this manner it is possible to condense or combine oils of dissimilar nature to produce entirely new products. Sufficient oil may be combined with whale oil or other oils capable of polymerizing in this manner to produce the complexes desired by the condensation of oils of different origin. Such composite polymerized products or complexes may if desired be hydrogenated or hydroxylated to any suitable extent and subsequently saponified to yield a soap. Such saponified products form a part of the present invention. For example, 2 parts of fish oil and 1 part of whale oil may be polymerized at 250° C. for 18 hours in the presence of an inert gas, that is to say, with oxygen excluded. If desired a catalytic agent may be added to aid in the condensation. Similarly fish oil or whale oil may be combined more or less with corn or cottonseed oil, or the more strongly drying oils and then if desired suitably hydrogenated and the product saponified.

To recapitulate, my invention involves the polymerization of oils, particularly fatty oils such as those having iodin number from 100 and upward, such polymerization preferably taking place at a temperature of about 250° C. and upward and the action being facilitated if desired by means of catalyzers, and preferably hydrogenating the polymerized product which hydrogen addition may take place either simultaneously or subsequent to polymerization; and my invention further involves the combining of two or more oils by polymerization or condensation so as to form products containing oils of different origin in chemical combination, due to such condensation or polymerization and the hydrogenation or hydroxylation or other hardening of such complex products of condensation, whereupon the product, either alone or admixed with other oils and fats, is saponified to produce soaps of satisfactory lathering properties or regulated solubilities.

The following procedure will serve to illustrate the present invention: Whale oil was heated in an atmosphere of carbon dioxid for 16 hours at a temperature between 250 and 270° C. The final product was viscous and the fishy odor was largely eliminated. The iodin number of the oil before heating was 135.5 and that obtained after heating had an iodin number of 89.7. The polymerized oil was treated with hydrogen in the presence of nickel material as a catalyzer and a product was obtained which did not appear to have any definite melting point. Changes in temperature between quite wide ranges did not appear to effect the consistency very materially. It melted completely at about 37° C. and the iodin number was found to be 65.9. A quantity of the whale oil which had not been polymerized was hydrogenated under the same conditions and soaps prepared from both the products by saponification with alkali under like conditions. The soap obtained from the hydrogenated whale oil had almost no lather in cold water, while the polymerized and hydrogenated product gave a copious lather in water of the same temperature. The fats as well as the corresponding soaps were free from any fishy odor. It appears to be an approximately correct statement that the lathering qualities of a soap depend on the melting point of the fats from which it is made. A soap made from oleic acid lathers rather easily in cold or slightly warm water, while that made from stearic acid requires a temperature of nearly 80° C. to develop a satisfactory lather. The absence of any definite melting point in the particular product illustratively given herein possessed no very definite melting point, as stated and was capable of lathering freely in cold or tepid water. Soaps prepared from oils which are highly unsaturated such as linseed oil or fish and whale oils are often prone to discolor due to the tendency to oxidation of some of the unsaturated constituents. If the oil is hardened to a point where discoloration is not liable to take place and undesirable odors are removed the lathering qualities are impaired, while by polymerizing a goodly proportion of the components which tend to bring about oxidation are eliminated without any material detrimental influence on the lathering properties and by final treatment with hydrogen a sufficient amount of consistent material is obtained to give the requisite body or firmness to the soap. The amount of hydrogen required is less, which is a saving in cost.

It is desirable, as stated, to polymerize the oil in the presence of inert gas, and hydrogen or carbon dioxid may be used for this purpose. When oxidized oil is desired a certain amount of oxygen may be introduced. This is usually undesirable as oxidized oils tend to discolor when present in soaps. The polymerized product obtained in accordance with the foregoing may be saponified in any suitable manner. The polymerized product may be used either alone or admixed with various other oils and fats commonly used in the manufacture of soaps, including a number of the hydrogenated oils. Rosin and filling materials including starch, silicate of soda, talc, abrasives and the like may be incorporated. Soap powders may also be prepared with this material. Soaps may be prepared by boiling or by the cold boiled process and various grades of saponified products including laundry and toilet soaps may be prepared. Caustic and carbonated soda and potash may be employed for saponification. As an illustration of a soap prepared in this manner: 20 parts of polymerized and hydrogenated whale oil, 9 parts of cottonseed oil, 11 parts of corn oil and 10 parts of rosin are boiled in any suitable manner with the equivalent of 12 parts of caustic potash. The rosin may be added after the other fats are saponified. The soap is sorted out and grained in the usual manner.

The following is from Serial No. 723,735 filed Oct. 3, 1912:

One of the objects of the present invention is the production of a free lathering soap not readily age hardening and not becoming difficultly lathering on storage.

It is also an object of my invention when making laundry soaps containing rosin to make use of certain peculiar conditions which obtain whereby the maximum detersive values are secured from rosin which is normally a relatively poor detergent; also if desired, to use a relatively high proportion of rosin without stickiness.

Especially it is an object to produce floating soaps of regulated solubility.

Among the several advantageous features of my invention, is that a properly made floating soap prepared in accordance herewith although it may be of a high degree of buoyancy, may be free lathering and not subject to serious age-hardening yet it does not show a troublesome degree of solubility so as to be wasteful in use. I regard this novel feature as due to the specific action of the components of the hydrogenated or co-hydrogenated oil and not to the mere presence of normal stearin; resulting in a different surface tension, which also may in part be due to polymeric changes effecting the colloidal nature of the saponified product favorably effecting the solubility and air absorbing and holding power in a manner which could not be cheaply arrived at, if at all, with common fats.

My invention comprises a soap preferably made from hydrogenated palm oil and has to do particularly with soaps of potash or soda combined with fats derived from palm oil or similar oil, preferably blended with other soap making oils or greases.

Apart from odor, color and tendency to form sticky compositions with rosin soap, the better grades of palm oil rank next to tallow in the quality of soap produced. Refined palm oil yields a firm soap which lathers more freely than tallow soap. The palm oil soaps when old become hard and lather very poorly.

What I claim is:—

1. The process of making soap which consists in polymerizing oils of different origin whereby a chemical combination thereof is produced and saponifying the polymerized product.

2. The process of making soap which consists in polymerizing oils of different origin in a non-oxidizing atmosphere whereby a chemical combination of the oils is produced and saponifying the polymerized product.

3. The process of making soap which consists in polymerizing oils of different origin at a temperature of about 250° C. in a non-oxidizing atmosphere, whereby a chemical combination of the oils is produced and saponifying the polymerized product.

4. The process of making soap which consists in polymerizing fish oil and whale oil whereby a chemical combination thereof is produced and saponifying the polymerized product.

5. The process of making soap which consists in heat polymerizing fish oil and whale oil in a non-oxidizing atmosphere, whereby a chemical combination of such oils is produced and saponifying the polymerized product.

6. The process of making free lathering soap which consists in polymerizing unsaturated fatty material, hydrogenating the polymerized product and saponifying the hydrogenated product.

7. The process of making free lathering soap which comprises polymerizing unsaturated fatty material in an atmosphere of hydrogen at a temperature of about 250° C., adding catalytic material thereto, lowering the temperature, continuing the contact of hydrogen and saponifying the hydrogenated product.

8. The process of producing a free lathering soap which consists in polymerizing oils of different origin whereby a chemical combination thereof is produced, hydrogenating the polymerized product and saponifying the hydrogenated product.

9. The process of making soap which consists in heat polymerizing oils of different origin at a temperature of about 250° C. in a non-oxidizing atmosphere whereby a chemical combination of the oils is produced, hydrogenating the saponified product and saponifying the hydrogenated product.

10. The process of making soap which consists in heat polymerizing fish oil and whale oil in a non-oxidizing atmosphere whereby a chemical combination of such oils is produced, hydrogenating the polymerized product and saponifying the hydrogenated product.

11. A soap comprising a saponified polymerized fatty body consisting of different origin chemically combined by polymerization.

12. A soap comprising a hydrogenated and saponified polymerized body consisting of oils of different origin united by polymerization.

13. A soap comprising a saponified fatty body consisting of fish oil and whale oil chemically combined by polymerization.

14. A soap comprising a saponified hydrogenated fatty body consisting of fish oil and whale oil chemically combined by polymerization.

Signed at Montclair in the county of Essex and State of New Jersey this 11th day of February A. D. 1915.

CARLETON ELLIS.

Witnesses:
 ENID CURTIS,
 B. M. ELLIS.